Sept. 12, 1950 A. L. TRADA 2,522,073
LURE CLIP FOR FISHHOOKS
Filed Feb. 15, 1949
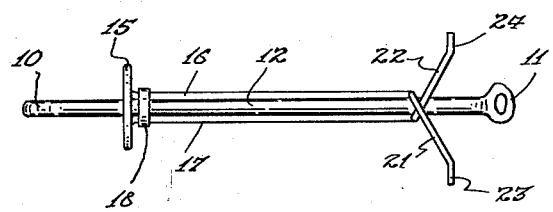
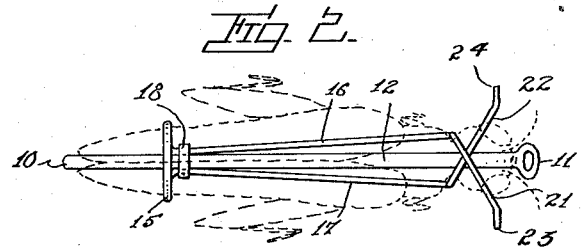
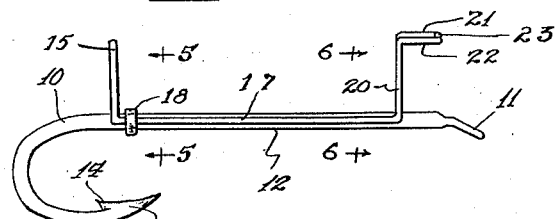
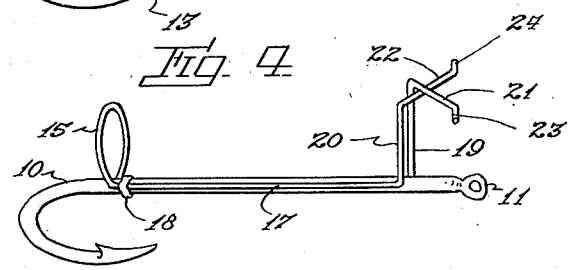
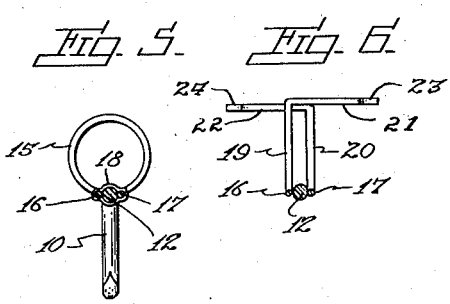
INVENTOR.
Albert L. Trada
BY
Smith & Wells Patented Sept. 12, 1950

2,522,073

UNITED STATES PATENT OFFICE 2,522,073

LURE CLIP FOR FISHHOOKS

Albert L. Trada, Coeur d'Alene, Idaho

Application February 15, 1949, Serial No. 76,433

4 Claims. (Cl. 43—44.4)

The present invention relates to improvements in a lure clip for fish hooks.

I am aware that a great variety of devices have been attached to fish hooks for the purpose of securing natural bait to the hooks. Most of these devices of which I am aware are directed to securing minnows, frogs and the like to the hook and are quite complicated in their structure. It is the purpose of my invention to provide a simple clip for attaching live insects, such as bugs, bees, grasshoppers and the like to a small hook in such a fashion that the insect is securely held, but is free insofar as his wings and legs are concerned to take a natural position with the aid of the clip itself. According to my invention the clip is composed of a single piece of wire having an upstanding loop directly opposite the point and barb of the hook. This loop serves to confine the rear end of the insect, but its wings and legs can be left outside the loop so that the insect is free to move in a natural manner. The insect is held against escape from the hook by upstanding portions of the wire clip near the eye of the hook, these portions being crossed to form spreaders for separating the upstanding portions so that the insect can be inserted between said portions. The crossed portions extend outwardly and forwardly in imitation of feelers, with which most insects are equipped. The crossed portions overlie the head of an insect in the clip to keep it in place.

The nature and advantages of my invention will appear more fully from the following description and the accompanying drawings. It should be understood, however, that the drawings and description are illustrative only and are not to be considered as limiting the invention except insofar as it is limited by the claims.

In the drawings:

Figure 1 is a top plan view of a hook equipped with my lure clip;

Figure 2 is a like view to Figure 1, but with a grasshopper indicated in dotted line and the lure clip spread;

Figure 3 is a side view of the hook and lure clip;

Figure 4 is a perspective view of the hook and lure clip;

Figure 5 is a sectional view taken on the line 5—5 of Figure 3; and

Figure 6 is a sectional view taken on the line 6—6 of Figure 3.

Referring now in detail to the drawings, my improved lure clip is shown attached to an ordinary fish hook 10. The hook has an eye at 11, a shank 12, a point 13, and the usual barb 14. The particular construction of the hook is immaterial insofar as my invention is concerned, since my improved lure clip can be attached to any hook having a shank of sufficient length for the clip selected. According to my invention, I form a piece of spring wire to provide a substantially circular loop 15, with two straight parallel portions 16 and 17 projecting at right angles to the plane of the loop 15. The portions 16 and 17 are arranged quite close to each other so as to receive the shank 12 of the hook between them and to bear on the sides of the shank. A bank or wrapping 18 of any suitable material, but preferably of metal, is placed around the shank 12 and the portions 16 and 17 and is soldered or welded to the hook shank and to the portions 16 and 17 so as to fix the loop 15 to the shank 12 in proportion to extend directly away from the shank on the side thereof opposite the point and barb of the hook.

The portions 16 and 17 must be resilient. They extend forwardly a distance sufficient to provide space for the body of the insect between the loop 15 and the upstanding clamping portions 19 and 20 at the front ends of the portions 16 and 17. At the upper end of the portions 19 and 20, the wire is bent at substantially right angles to these portions to provide forwardly extending, crossing extensions 21 and 22. The free ends of the extensions 21 and 22 are turned out as indicated at 23 and 24 so that they imitate in appearance the antennae of a grasshopper.

In attaching the hopper to the hook, the tapered rear body of the hopper is first inserted in the loop 15 far enough to bring the hopper's head back of the upright portions 19 and 20. Pressure is applied to the ends 23 and 24 to spread the portions 19 and 20 apart after which the hopper's head can be inserted as illustrated in Figure 2 so that the portions 19 and 20 engage at the restricted part of the hopper's body immediately back of its head. The crossed extensions 21 and 22 overlie the hopper's head and the portions 16 and 17 are directly beneath the hopper's body so that it is firmly held in a natural position along the back of the hook shank 12.

It is believed to be obvious from the foregoing description that my improved lure clip provides a simple and effective means for attaching a live grasshopper to a hook in a natural position so that the hopper is free to move its wings and legs in a natural manner.

The drawings, of course, show the hook end of the clip somewhat enlarged, since in normal manufacture the size would be approximately half that shown. The lure clip may be applied to hooks with long or short shanks and the formation of the curved portion of the hook, the barb and the point may be of any desired configuration. The spring portions 16 and 17 lie along side the hook shank and are thus protected from damage to a substantial degree. If the loop 15 or the upstanding portions 19 and 20 should happen to be bent or distorted in use, they can readily be straightened to put the clip again in operative condition.

Having thus described my invention, I claim:

1. The combination with a fish hook provided with a shank, of a lure clip for mounting an insect such as a grasshopper, a bug, a bee or the like on the hook, said clip comprising a wire secured to the hook and having a central upstanding loop on the shank opposite the point of the hook for receiving the rear portion of the insect's body, said wire having resilient portions extending from said loop along the shank toward the eye end of the hook, said wire having upstanding portions near the eye of the hook and forwardly directed crossed extensions at the top ends of said upstanding portions adapted to overlie the head of the insect.

2. The combination with a fish hook provided with a shank, of a lure clip for mounting a live insect, such as a grasshopper, a bug, a bee or the like, on the hook, said clip comprising an upstanding loop fixed on the hook shank near the hook end thereof, spring arms secured to the shank and extending along opposite sides of the shank from the loop toward the eye end of the hook, and turned up at their ends remote from the loop in a direction substantially parallel to the loop and having crossed extensions at the tops of the upturned portions of said arms.

3. The combination with a fish hook provided with a shank, of a lure clip for mounting a live insect, such as a grasshopper, a bug, a bee or the like, on the hook, said clip comprising an upstanding loop fixed on the hook shank near the hook end thereof, spring arms secured to the shank and extending along opposite sides of the shank from the loop toward the eye end of the hook, and turned up at their ends remote from the loop in a direction substantially parallel to the loop to provide gripping portions adapted to receive the body of the insect between them, the arms being extended forwardly and toward each other from the top ends of said gripping portions to hold the body between the gripping portions.

4. The combination with a fish hook provided with a shank, of a lure clip for mounting a live insect on the hook, said clip comprising spring arms, each secured at one end to the shank, said arms extending along the shank on opposite sides thereof and being free at their other ends so they may be spread apart, a loop projecting away from the shank at the secured ends of the arms, said arms having upstanding portions at their free ends to engage the body of an insect placed between said portions, and antenna-like extensions at the upper ends of said upstanding portions overlying the shank.

ALBERT L. TRADA.

REFERENCES CITED

The following references are of record in the file of this patent:

UNITED STATES PATENTS

| Number | Name | Date |
|---|---|---|
| 914,478 | Bradley et al. | Mar. 9, 1909 |
| 2,150,874 | Wagner | Mar. 14, 1939 |

FOREIGN PATENTS

| Number | Country | Date |
|---|---|---|
| 802,293 | France | June 6, 1936 |